May 10, 1927.  P. G. WOOD  1,627,760
WINDSHIELD SCREEN
Filed July 25, 1925
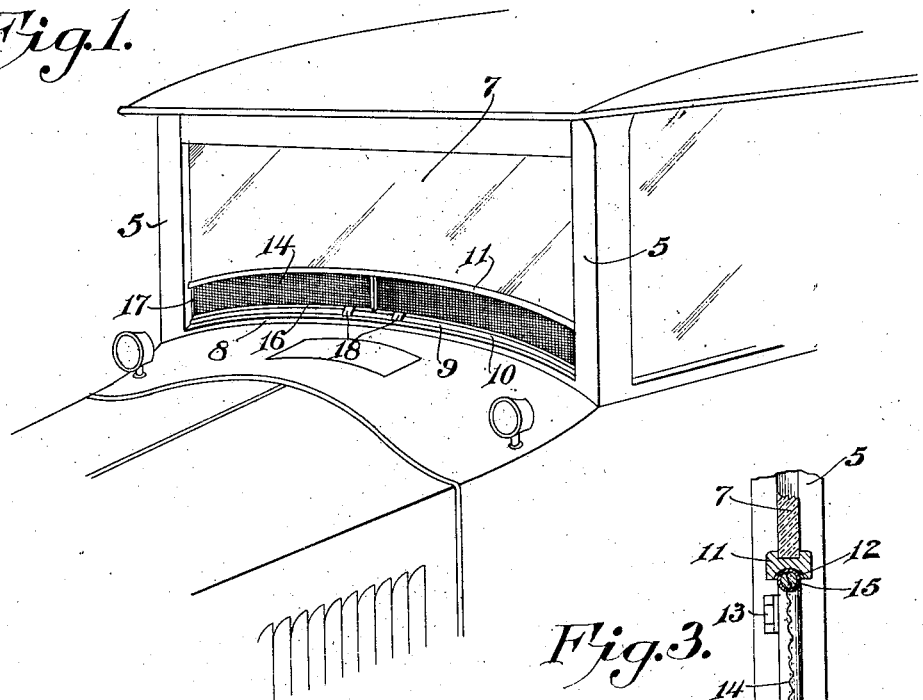
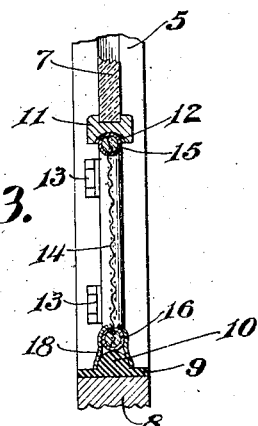
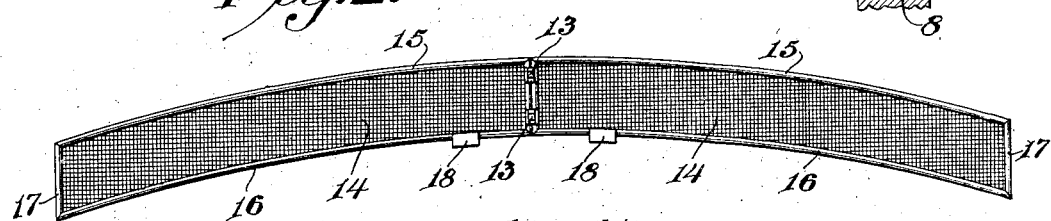
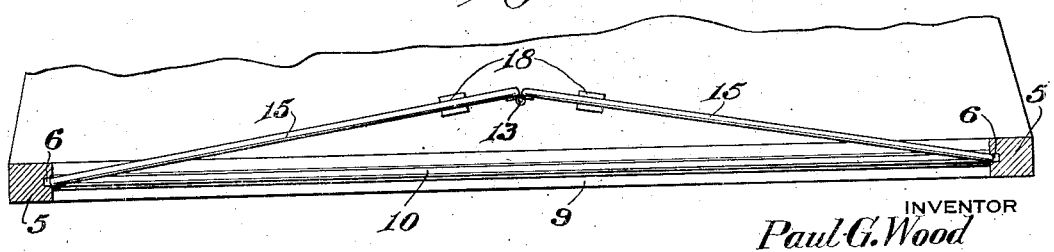
INVENTOR
Paul G. Wood
WITNESSES
Chas. L. McDonald
E. N. Lovewell
BY E. G. Siggers
ATTORNEY Patented May 10, 1927.

1,627,760

UNITED STATES PATENT OFFICE.

PAUL GEORGE WOOD, OF HILLIARDS, OHIO.

WINDSHIELD SCREEN.

Application filed July 25, 1925. Serial No. 46,127.

This invention relates to a windshield screen adapted for use in automobiles, especially those of the sedan or coach type, which have a vertically slidable windshield.

The general object of the invention is to provide a screen which may be easily and quickly inserted from the inside of the car into the frame of the windshield when the latter is raised, and which may be securely held therein by its engagement with the edges of the frame and the lower edge of the windshield, so as to prevent insects from flying, or being blown into the interior of the car. The screen also serves to modify the force of the wind, allowing it to blow in with just enough velocity to make the interior of the car comfortable.

The detailed construction of the invention and the advantages thereof will be more fully explained in connection with the accompanying drawing illustrating one embodiment thereof.

In the drawing:

Figure 1 is a perspective view illustrating the invention as applied to one of the more recent models of closed cars.

Figure 2 is a front elevation of the screen detached.

Figure 3 is a section taken transversely of the screen and the adjacent frame, as shown in Figure 1.

Figure 4 is a plan view illustrating the manner in which the screen is placed in the windshield frame, the latter being shown in section.

Referring more specifically to the drawing, the invention is shown in connection with one of the latest Buick closed car models, having a windshield frame with end rails 5, each of which is provided on its inner side with a channel 6 for receiving the end of the windshield 7, the latter being slidable vertically to open or close the same. The lower rail 8 of the windshield frame conforms to the shape of the cowl, and has a rubber strip 9 secured thereto, which is formed on its upper face with a bead 10. The lower rail 11 of the windshield sash has a groove 12 in its under side, which rests on the bead 10 when the windshield is closed, and forms a water-tight joint.

The screen, which constitutes the invention, consists of two equal sections disposed end to end and connected by hinges 13. Each section comprises screening 14 set in upper and lower tubular rails 15 and 16, which are connected at their outer ends by end rails 17. All parts of the screen are made from copper, or other suitable non-corrodible metal. The upper and lower rails 15 and 16 are parallel and bent to conform to the shape of the rail 8. The combined length of the two sections of the screen is such that when the screen is straightened, the end rails 17 will fit into the channels 6 at opposite ends of the windshield frame. The lower rail 16 of each section is provided with one or more pairs of lugs 18, which are secured thereto in any suitable manner, and are shaped so as to fit the opposite faces of the bead 10. The upper rail 15 fits into the groove 12, so that the screen may be securely held in position between the lower rail 11 of the windshield sash and the lower rail 8 of the windshield frame. The screen may be easily inserted or removed by folding it as indicated in Figure 4, and this may be done by the driver without leaving his seat. The use of the screen permits the windshield to be raised and the interior of the car to be ventilated without the possibility of insects getting into the interior of the car. The screen is low enough so as not to interfere with the vision of the driver, and it serves not only to keep out the insects, but to split up the wind and to modify its force.

While the screen has been illustrated in connection with a specific type of car, it will, of course, be understood that its size and the shape of its various parts may be suitably modified to conform to any type of car for which it is designed. For example, in some cars the windshield has no bottom rail; in such case the upper rail 15 is modified so as to fit the lower edge of the glass, and the shape of the lugs is modified to fit over the different shaped rubber strip on the lower rail of the frame. It is also obvious that a screen embodying the same essential features may be used in doors or windows having panes of glass which open in a similar manner. It is to be understood that all such modifications are included within the scope of the invention as claimed.

What is claimed is:

A windshield screen comprising a frame made up of two sections in end to end relation, hinges connecting the two sections, the ends of the screen frame, when the latter is straightened, being adapted to fit into the guideways at the ends of the windshield frame, said screen frame sections having upper and lower metal rails shaped so as to engage the adjacent edges of the windshield and windshield frame respectively throughout their length, the lower rail having opposed lugs secured thereto and shaped to engage the opposed faces of the adjacent edge portions to hold the screen in position.

In testimony, that I claim the foregoing as my own, I have hereto affixed my signature.

PAUL GEORGE WOOD.